Nov. 18, 1952  R. E. PECKHAM  2,618,193
SHEET METAL FASTENER
Filed April 11, 1950

INVENTOR.
ROY E. PECKHAM
BY
ATTORNEY

Patented Nov. 18, 1952

2,618,193

UNITED STATES PATENT OFFICE 2,618,193

SHEET METAL FASTENER

Roy E. Peckham, Detroit, Mich., assignor to
Robert L. Brown, Ferndale, Mich.

Application April 11, 1950, Serial No. 155,282

2 Claims. (Cl. 85—38)

This invention relates to a fastener and more particularly to a fastener for securing two members together such as metal panels or a molding to a panel.

It is an object of the present invention to provide a permanently deformable fastener which may be inserted through aligned openings in the two members and deformed to a holding position whereby the members are drawn into close contact with each other.

Another object of the invention is to provide a fastener having a central bendable section with oppositely disposed engaging portions at opposite sides of the bendable section whereby each pair of engaging portions are brought into holding engagement with the panels by bending one pair of engaging portions toward each other.

Other objects and advantages of the invention will more fully appear from the following description taken in connection with the accompanying drawing in which.

Figure 1:
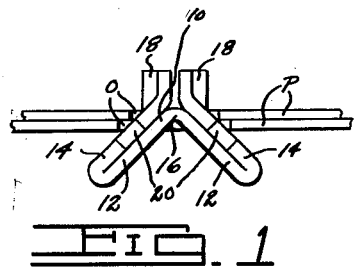
Fig. 1 is a cross sectional view through a pair of panels showing the fastener in end elevation and before it is bent to retaining position.
Figure 4:
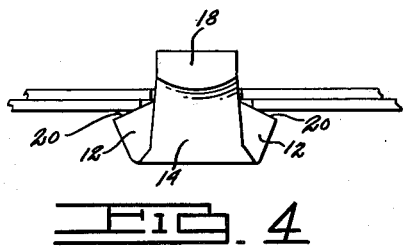
Fig. 4 is a side elevational view of the fastener shown in Fig. 1, the panels being shown in section.

Referring to the drawings, the fastener comprises a sheet metal stamping formed from malleable metal which may be permanently deformed as distinguished from a spring steel metal which, when bent, will return to its normal position.

The fastener is formed from flat sheet material, cut to the desired shape, and bent in suitable dies to its finished shape and form. When finish formed there is provided a central body portion 10 and diverging arms 12 at substantially right angles to each other. The outer ends of the arms 12 are reversely bent upon the outer surface of the arms 12 to form arms 14 extending in converging relation toward the center of the body 10. The arms 14 reinforce the arms 12 and terminate short of the apex 16 to permit bending of the central portion at 16.

The outer free ends of the arms 14 are bent in spaced parallel relation extending away from the arms 12 and 14 forming projections 18 adapted for insertion in the openings of the parts to be joined. The projections 18, in top plan view, are formed arcuate to add rigidity thereto.

Figure 2:
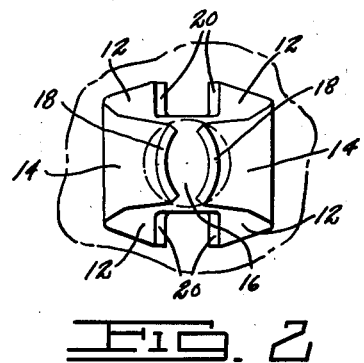
Fig. 2 is a top plan view of the fastener shown in Fig. 1.

Referring to Fig. 2, the arms 12 project laterally beyond the side edges of the central portion 16, forming tapered shoulders 20 for contact with the under side of the panel with which the fastener is to be used. These laterally extending shoulders further increase the rigidity of the arms 12 and 14 and localize bending to the single thickness portion of the fastener at its central portion 16.

Figure 3:
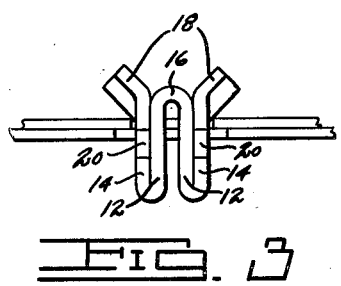
Fig. 3 is a view corresponding to Fig. 1 showing the fastener bent to its retaining position.
Figure 6:
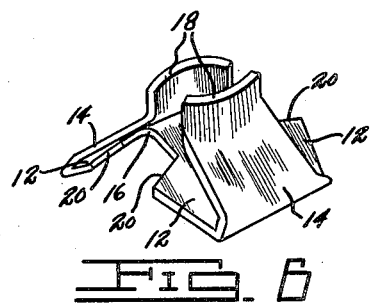
Fig. 6 is a perspective view of the fastener shown in Figs. 1, 2, and 4.

The fastener is formed to the shape shown in Fig. 1 and is adapted to be inserted through openings O in overlapping panels P. The fastener is inserted from the underside of the panels and the shoulders 20 limit the position of the fastener by their engagement with the under surface of the lower panel. A suitable tool, such as a pair of pliers, is used to pinch the two divergent arms, formed by the double thickness of arms 12 and 14, toward each other. This action causes a bending of the weakened central section 16 and the projections, fulcrumed on the outer surfaces of the bent central section, are bent away from each other in divergent relation into tight contact with the inner wall of the openings of the panels, as illustrated in Fig. 3. Since the projections 18 are divergent the outer surfaces contact the outer edge of the opening and urge the upper panel toward the lower panel, the latter being held by the shoulders 20.

Figure 5:
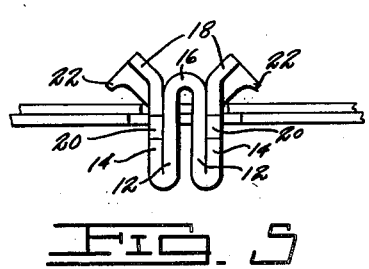
Fig. 5 is a cross sectional view through a pair of panels showing in end elevation a modified form of the invention.

In the form of the invention illustrated in Fig. 5, I have shown the projections 18 having their outer free ends provided with outwardly extending flanges 22 which overlie the outer surface of the upper panel when the arms are bent as aforesaid into holding position.

When the fastener is assembled, the bending together of the divergent arms cause the outer bending of the projections 18 which grip on the inner edge of the opening in the panel, and the weakened portion 16 is drawn upwardly into the opening holding the arms in tight engagement with the side walls of the openings.

The edges of the tapered surface of the shoulders 20 bite into the edges of the opening in the upper panel and prevent turning of the fastener relative to the panels. When the panels are comparatively thin, the tapered surface will deform the edge of the opening in the upper panel to cause the tapered surface to engage the edge of the opening in the lower panel.

Figure 7:
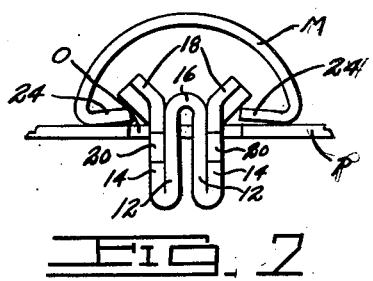
Fig. 7 is a cross sectional view through a panel and molding showing an end elevational view of the fastener in its holding position for securing a molding to a panel.

In Fig. 7 I have illustrated the fastener as applied to a panel for holding a molding thereto. The panel P is provided with an opening O and a molding M, having inwardly extending flanges 24 positioned at opposite sides of the opening O, when applied to the panel. The fastener, in its originally formed shape, is inserted through the opening O and the arms 14 are pinched toward each other. This causes the projections to spread outwardly and to take a divergent position whereby the projections are brought into holding contact with the inner edges or surfaces of the flanges 24 of the molding M.

From the above, it will be noted that the fastener herein disclosed is of particular utility in the assembly of parts which are only accessible from one side of the two parts or in blind openings.

While I have illustrated and described a preferred embodiment of the invention, it will be understood that various changes, including the size, shape and arrangement of parts, may be made without departing from the spirit of my invention and it is not my intention to limit its scope other than by the terms of the appended claims.

I claim:

1. A malleable fastener for insertion into a hole through a panel, said fastener being a single strip of sheet metal bent along a transverse line at its mid-portion and having its end portions folded back adjacent the outer surfaces of the mid-portion to provide two divergent arms of double thickness, said end portions terminating in panel engaging portions extending outwardly from said mid-portion substantially parallel with each other, said mid-portion having a length greater than twice the thickness of the mid-portion and being of no greater width than the maximum dimension between the outer surfaces of said panel engaging members, said divergent arms having portions of greater width than said maximum dimension spaced from said panel engaging portions and adapted to engage the face of said panel opposite said panel engaging portions, whereby said fastening portions may be inserted into said hole and said divergent arms may be forced toward each other to permanently bend said mid-portion and produce divergence of said panel engaging portions and entrance of said mid-portion into said hole to cause spreading between said panel engaging portions.

2. A malleable fastener for insertion into a hole through a panel, said fastener being a single strip of sheet metal bent along a transverse line at its mid-portion and having its end portions folded back adjacent the outer surfaces of the mid-portion to provide divergent arms of double thickness, said end portions terminating in panel engaging portions extending outwardly beyond said mid-portion, said mid-portion having a length greater than twice the thickness of the mid-portion and being of no greater width than the maximum dimension between the outer surfaces of said panel engaging members, said divergent arms having portions of greater width than said maximum dimension spaced from said panel engaging portions and adapted to engage the face of said panel opposite said panel engaging portions, whereby said fastening portions may be inserted into said hole and said divergent arms may be forced toward each other to permanently bend said mid-portion and produce entrance of said mid-portion into said hole to cause spreading between said panel engaging portions.

ROY E. PECKHAM.

REFERENCES CITED

The following references are of record in the file of this patent:

UNITED STATES PATENTS

| Number | Name | Date |
| --- | --- | --- |
| 2,137,542 | Murphy | Nov. 22, 1938 |
| 2,184,250 | Chaffee | Dec. 19, 1939 |
| 2,214,150 | Van Uum | Sept. 10, 1940 |
| 2,460,722 | Waara | Feb. 1, 1949 |